US012617631B2

(12) United States Patent
Ueda et al.

(10) Patent No.: US 12,617,631 B2
(45) Date of Patent: May 5, 2026

(54) ARTICLE TRANSPORT FACILITY

(71) Applicant: Daifuku Co., Ltd., Osaka (JP)

(72) Inventors: Toshihito Ueda, Hinocho (JP); Shota Inden, Hinocho (JP); Akira Suzuki, Hinocho (JP); Ryoji Kishi, Hinocho (JP); Ayaka Kawanami, Hinocho (JP); Yoshitaka Tanaka, Hinocho (JP); Tatsuki Ii, Hinocho (JP); Noriyuki Ikuta, Hinocho (JP); Yuya Hirao, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 203 days.

(21) Appl. No.: 18/536,808

(22) Filed: Dec. 12, 2023

(65) Prior Publication Data

US 2024/0190665 A1     Jun. 13, 2024

(30) Foreign Application Priority Data

Dec. 13, 2022     (JP) ................................. 2022-198691

(51) Int. Cl.
B65G 47/57          (2006.01)
B65G 43/10          (2006.01)
(52) U.S. Cl.
CPC ............. B65G 47/57 (2013.01); B65G 43/10 (2013.01)
(58) Field of Classification Search
CPC ................................ B65G 47/57; B65G 43/10

USPC ...................................................... 198/369.1
See application file for complete search history.

(56) References Cited

U.S. PATENT DOCUMENTS

| | | | | |
|---|---|---|---|---|
| 6,240,335 B1 * | 5/2001 | Wehrung | ........... | G05B 19/4189 |
| | | | | 198/577 |
| 9,988,218 B2 * | 6/2018 | Dugat | .................... | B65G 13/10 |
| 10,274,953 B1 * | 4/2019 | Agarwal | .............. | G05D 1/0027 |
| 11,760,568 B2 * | 9/2023 | Ambrosi | .................. | B65G 1/04 |
| | | | | 700/218 |
| 12,049,368 B2 * | 7/2024 | Heller | .................... | B65G 47/69 |
| 2022/0194701 A1 * | 6/2022 | Takahara | ............. | B65G 1/0457 |

FOREIGN PATENT DOCUMENTS

| | | | |
|---|---|---|---|
| JP | 2006313463 A | | 11/2006 |
| JP | 202296668 A | | 6/2022 |
| JP | 2023013613 A | * | 1/2023 |

* cited by examiner

*Primary Examiner* — Gene O Crawford
*Assistant Examiner* — Lester Rushin, III
(74) *Attorney, Agent, or Firm* — The Webb Law Firm

(57)          ABSTRACT

An article transport facility includes a plurality of transport vehicles, a first traveling rail, a second traveling rail below the first traveling rail, a lifter including a lift rail, and a control system. In response to a preliminary request signal from a target transport vehicle, the control system performs a preliminary lifting process of moving the lift rail to a target position when no non-target transport vehicle is on the lift rail and no entry request signal is received from a non-target transport vehicle.

7 Claims, 10 Drawing Sheets

Fig.5

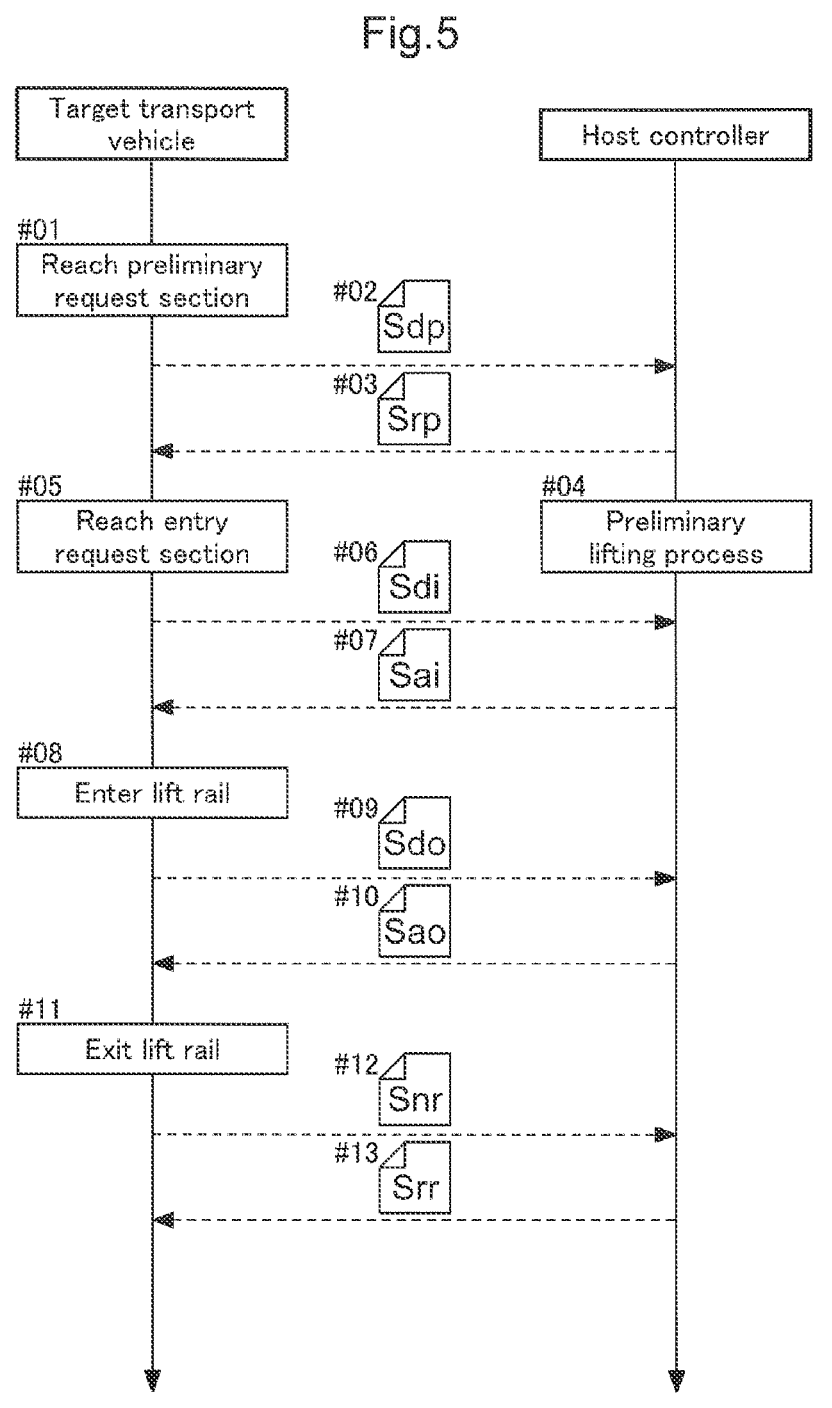

Target transport vehicle

Host controller

01
Reach preliminary request section

02 Sdp

03 Srp

05
Reach entry request section

04
Preliminary lifting process

06 Sdi

07 Sai

08
Enter lift rail

09 Sdo

10 Sao

11
Exit lift rail

12 Snr

13 Srr

ARTICLE TRANSPORT FACILITY

CROSS REFERENCE TO RELATED APPLICATION

This application claims priority to Japanese Patent Application No. 2022-198691 filed Dec. 13, 2022, the disclosure of which is hereby incorporated by reference in its entirety.

BACKGROUND OF THE INVENTION

Field of the Invention

The present invention relates to an article transport facility.

Description of Related Art

Article transport facilities including multiple transport vehicles for transporting articles and a control system for controlling the transport vehicles are used. An example of such article transport facilities is described in Japanese Unexamined Patent Application Publication No. 2006-313463 (Patent Literature 1).

In the article transport facility described in Patent Literature 1, a transport vehicle (5) approaching in front of a branching portion or a joining portion in a traveling rail (1) transmits an entry request signal (blocking request in Patent Literature 1) to a control system (zone controller 11). The control system receiving the entry request signal determines whether the transport vehicle can enter, for example, the branching portion, and transmits an entry permission signal (permission in Patent Literature 1) to the transport vehicle when permitting the entry. This entry adjustment process allows transport vehicles to avoid colliding with one another in, for example, branching portions.

Another known article transport facility described in, for example, Japanese Unexamined Patent Application Publication No. 2022-96668 (Patent Literature 2) includes vertically parallel travel paths for transport vehicles (ceiling-hung transport vehicles 12) (e.g., paragraph 0027 and FIG. 3 in Patent Literature 2). The article transport facility may include a lifter between a first traveling rail (upper traveling rail 11A) and a second traveling rail (lower traveling rail 11B) below the first traveling rail to allow the transport vehicles to move between the first and second traveling rails.

The area including the lifter may be equivalent to the branching portions or joining portions in the article transport facility in Patent Literature 1. Thus, an entry adjustment process similar to the process described in Patent Literature 1 may be used. The process may allow, in addition to simply allowing the transport vehicles to avoid colliding with one another, the transport vehicles to pass the area including the lifter efficiently.

SUMMARY OF THE INVENTION

The transport vehicles are to travel more efficiently in an area including the lifter. This may eventually improve the transport efficiency of the entire article transport facility.

An article transport facility according to an aspect of the present disclosure includes a plurality of transport vehicles that transport articles, a first traveling rail for the plurality of transport vehicles to travel, a second traveling rail below the first traveling rail and being a rail for the plurality of transport vehicles to travel, a lifter that lifts and lowers the plurality of transport vehicles between the first traveling rail and the second traveling rail, and a control system that controls the plurality of transport vehicles and the lifter. The first traveling rail includes a first upstream area and a first downstream area discontinuous from each other. The first upstream area is upstream from a lift area in which the lifter is located, and the first downstream area is downstream from the lift area. The second traveling rail includes a second upstream area and a second downstream area discontinuous from each other. The second upstream area is upstream from the lift area, and the second downstream area is downstream from the lift area. The lifter includes a lift rail for the plurality of transport vehicles to travel. The lift rail ascends and descends in the lift area. The lift rail at a first position connects the first upstream area and the first downstream area in the first traveling rail. The lift rail at a second position connects the second upstream area and the second downstream area in the second traveling rail. The plurality of transport vehicles in an entry request section transmit an entry request signal to the control system to request permission for entering the lift rail. The plurality of transport vehicles in a preliminary request section transmit a preliminary request signal to the control system. The entry request section is defined in each of the first upstream area and the second upstream area. The preliminary request section is defined upstream from the entry request section in each of the first upstream area and the second upstream area. The plurality of transport vehicles include a target transport vehicle and a non-target transport vehicle other than the target transport vehicle. In response to the entry request signal from the target transport vehicle, the control system transmits an entry permission signal to the target transport vehicle to permit entry into the lift rail when the lift rail is at a target position and no non-target transport vehicle is on the lift rail, where the target position is one of the first position or the second position corresponding to a target upstream area, the other of the first position or the second position not being the target position is a non-target position, and the target upstream area is one of the first upstream area or the second upstream area including the target transport vehicle. In response to the preliminary request signal from the target transport vehicle, the control system performs a preliminary lifting process of moving the lift rail not at the target position to the target position when no non-target transport vehicle is on the lift rail and no entry request signal is received from the non-target transport vehicle.

In this structure, the target transport vehicle in the preliminary request section upstream from the entry request section transmits a preliminary request signal to the control system before transmitting an entry request signal. The control system can thus expect that the target transport vehicle is to travel on the lift rail. When the lift rail is not at the target position, the control system receiving the preliminary request signal can move the lift rail to the target position in advance without interrupting other traveling non-target transport vehicles. Thus, the target transport vehicle to pass the lift rail may wait a shorter period in front of the lift rail before being allowed to enter the lift rail. The target transport vehicle can travel more efficiently in the lift area. This improves the transport efficiency of the entire article transport facility.

Further features and advantageous effects of the technique according to the present disclosure will be apparent from exemplary and nonlimiting embodiments described below with reference to the drawings.

BRIEF DESCRIPTION OF THE DRAWINGS

The terms Fig., Figs., Figure, and Figures are used interchangeably in the specification to refer to the corresponding figures in the drawings.

FIG. 5 is a flowchart of a process performed on a transport vehicle passing the lift area.

DESCRIPTION OF THE INVENTION

An article transport facility according to an embodiment will be described with reference to the drawings.

Figure 1:
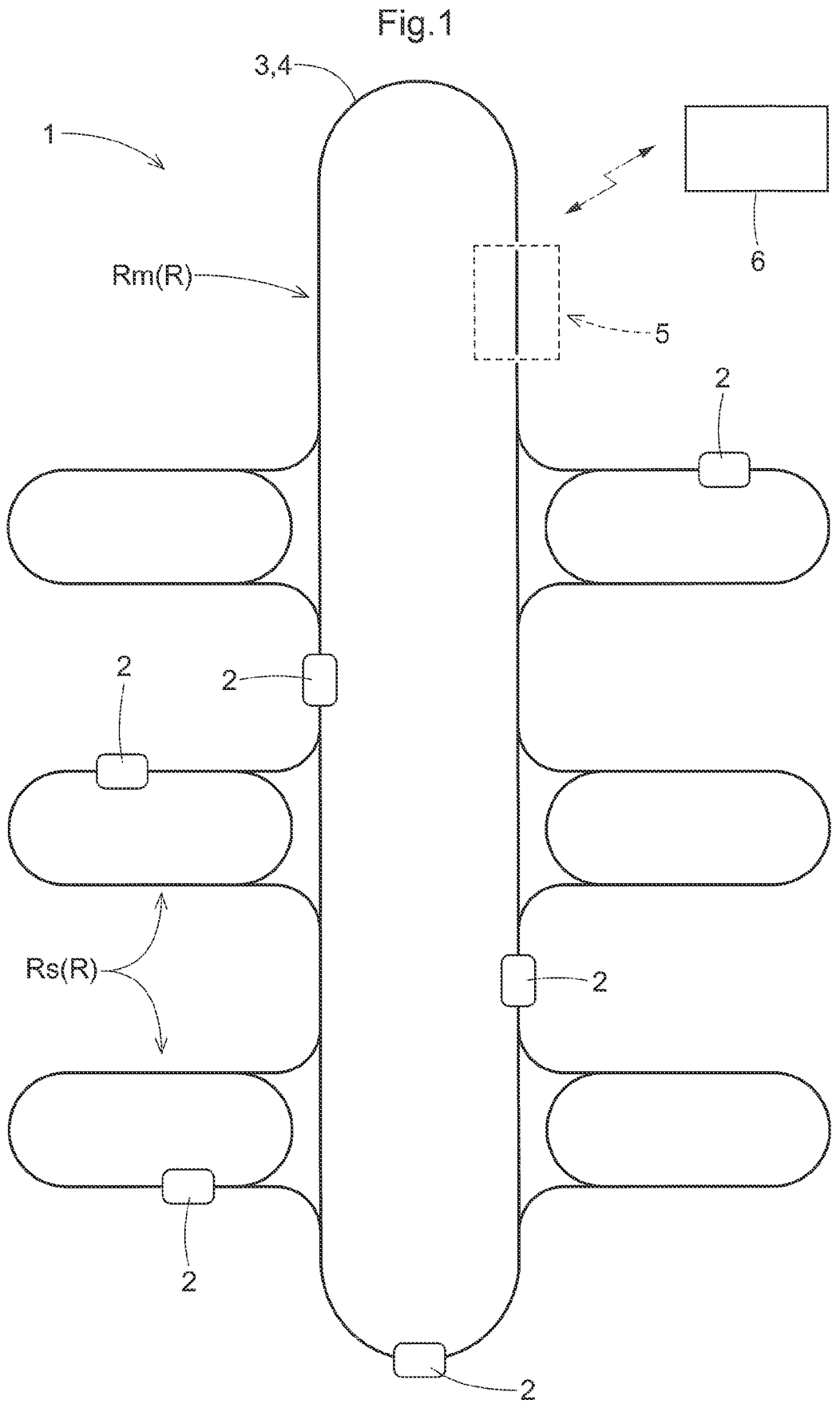
FIG. 1 is a plan view of an article transport facility.

As shown in FIG. 1, an article transport facility 1 includes transport vehicles 2, a first traveling rail 3, a second traveling rail 4, a lifter 5, and a control system 6. The first traveling rail 3 and the second traveling rail 4 overlap each other as viewed in plan.

The transport vehicles 2 transport articles B. The transport vehicles 2 travel along a travel path R to transport the articles B. In the present embodiment, the travel path R includes a looped main transport path Rm and multiple looped sub-transport paths Rs branching from the main transport path Rm and joining the main transport path Rm again. The transport vehicles 2 transport the articles B along the travel path R in response to transport commands from the control system 6.

The articles B handled in the article transport facility 1 and transported by the transport vehicles 2 include various items. For the article transport facility 1 used in a semiconductor manufacturing plant, for example, the articles B are wafer containers (front opening unified pods, or FOUPs) accommodating wafers or reticle containers (reticle pods) accommodating reticles. In this case, the transport vehicles 2 transport, between processes, the articles B such as wafer containers or reticle containers along the travel path R.

Figure 2:
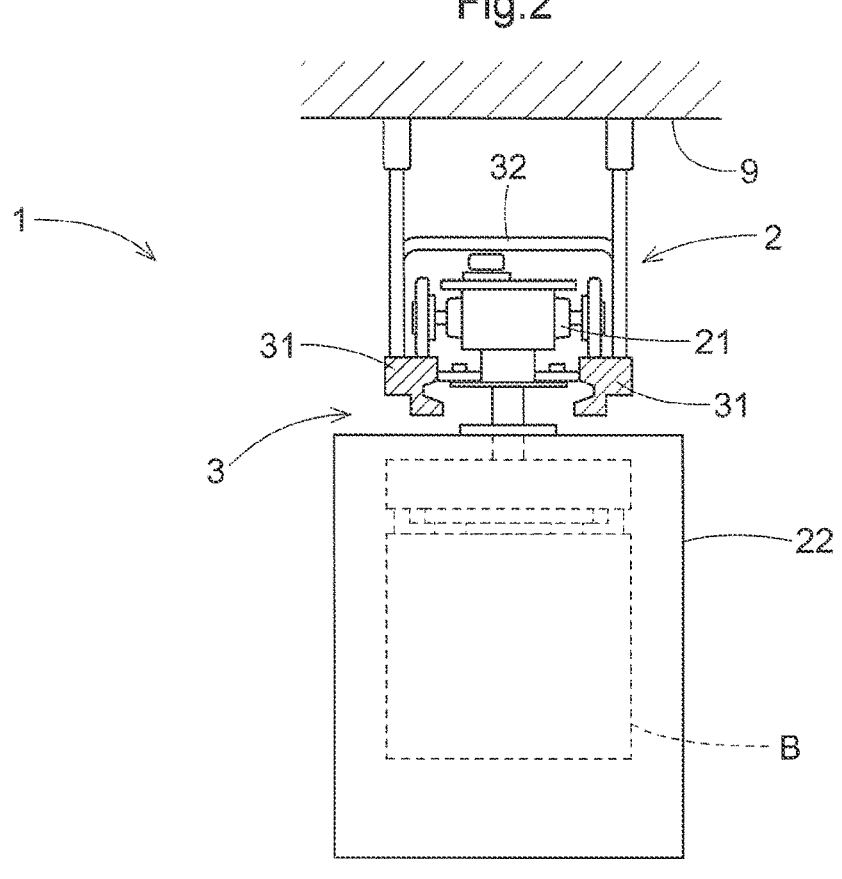
FIG. 2 is a front view of traveling rails and transport vehicles.
Figure 2:
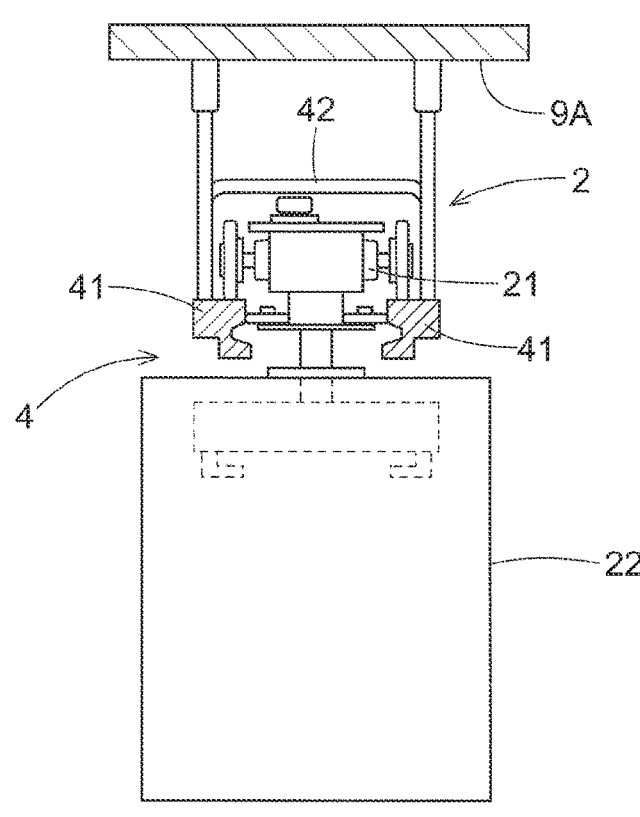

In the present embodiment, the transport vehicles 2 are automated guided vehicles traveling near a ceiling 9. As shown in FIG. 2, the transport vehicles 2 in the present embodiment each include a traveler 21 and a transferer 22. The traveler 21 travels on the first traveling rail 3 or the second traveling rail 4 installed near the ceiling 9. The transferer 22 is hung from the traveler 21 and holds an article B while the traveler 21 is traveling. The transferer 22 also picks up the article B from or puts the article B on, for example, a supply unit for the articles B or a processing device when the traveler 21 is not moving.

In the present embodiment, the first traveling rail 3 is installed immediately below the ceiling 9. The first traveling rail 3 extends along the travel path R. The first traveling rail 3 includes first rails 31 and a first support 32. The first rails 31 define a track for the travelers 21 in the transport vehicles 2 to travel and include a pair of left and right rails. The pair of first rails 31 are directly hung from the ceiling 9 with the first support 32.

The second traveling rail 4 is installed near the ceiling 9 and below the first traveling rail 3. The second traveling rail 4 extends along the travel path R. The second traveling rail 4 includes second rails 41 and a second support 42. The second rails 41 define a track for the travelers 21 in the transport vehicles 2 to travel and include a pair of left and right rails. The pair of second rails 41 are hung, with the second support 42, from a support wall 9A that is parallel to a horizontal plane and located further below the transferer 22 of each transport vehicle 2 that travels on the first traveling rail 3.

Figure 3:
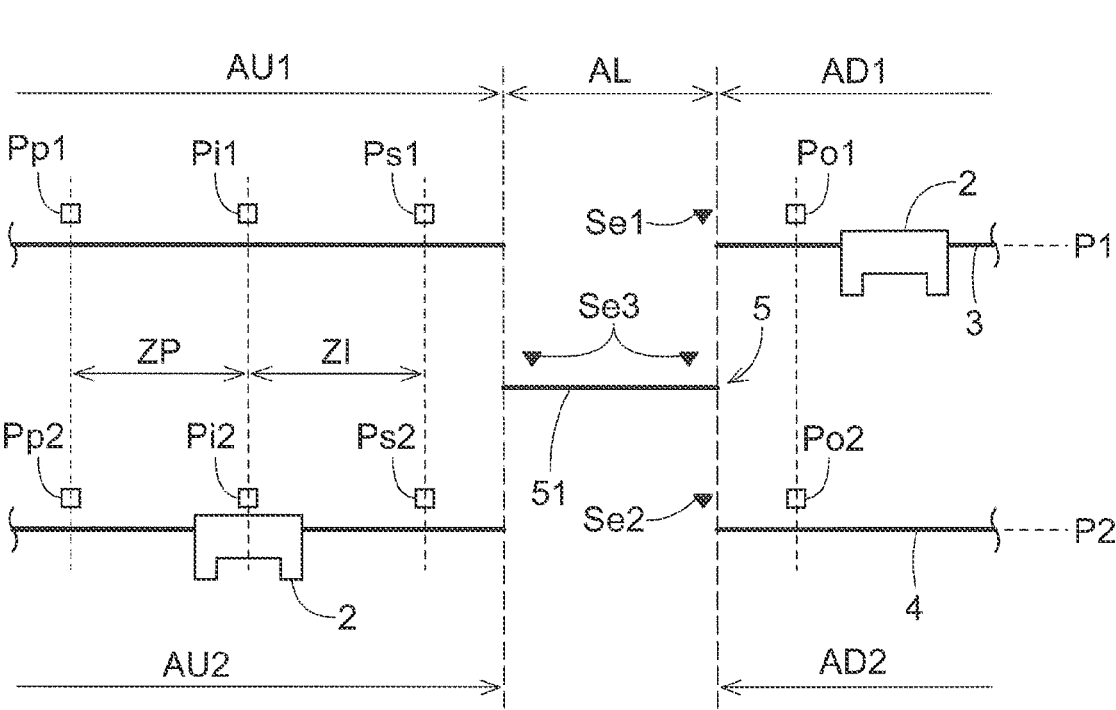
FIG. 3 is a schematic diagram of a lift area and areas adjacent to the lift area.

As shown in FIG. 3, neither the first traveling rail 3 nor the second traveling rail 4 is continuous along the entire travel path R. The first traveling rail 3 and the second traveling rail 4 are each partially discontinuous. The first traveling rail 3 and the second traveling rail 4 are each discontinuous near the lifter 5. In the present embodiment, an area including the lifter 5 is referred to as a lift area AL.

The first traveling rail 3 includes a first upstream area AU1 upstream from the lift area AL and a first downstream area AD1 downstream from the lift area AL discontinuous from each other. Similarly, the second traveling rail 4 includes a second upstream area AU2 upstream from the lift area AL and a second downstream area AD2 downstream from the lift area AL discontinuous from each other. Being upstream and being downstream refer to the traveling direction of a transport vehicle 2. A transport vehicle 2 moving forward travels downstream, and a transport vehicle 2 moving in the opposite direction travels upstream. The first upstream area AU1 and the second upstream area AU2 are in the same range along the travel path R. Similarly, the first downstream area AD1 and the second downstream area AD2 are in the same range along the travel path R.

The lifter 5 is located between the first traveling rail 3 and the second traveling rail 4 (in the lift area AL) to lift and lower a transport vehicle 2 in the lift area AL. The lifter 5 includes a lift rail 51 and an elevator (not shown). The lift rail 51 includes a pair of rails for the traveler 21 in the transport vehicle 2 to travel. The elevator allows the lift rail 51 to ascend and descend between a first position P1 and a second position P2 below the first position P1. The elevator may be powered in any manner, for example, hydraulically or with a motor.

The first position P1 is set at the same level as the first traveling rail 3. The lift rail 51 ascends to the first position P1 to fill the discontinuous portion of the first traveling rail 3. In other words, the lift rail 51 at the first position P1 connects the first upstream area AU1 and the first downstream area AD1 in the first traveling rail 3. In this state, a transport vehicle 2 on the first upstream area AU1 in the first traveling rail 3 can enter the lift rail 51 and exit the lift rail 51 to the first downstream area AD1.

The second position P2 is set at the same level as the second traveling rail 4. The lift rail 51 descends to the second position P2 to fill the discontinuous portion of the second traveling rail 4. In other words, the lift rail 51 at the second position P2 connects the second upstream area AU2 and the second downstream area AD2 in the second traveling rail 4. In this state, a transport vehicle 2 on the second upstream area AU2 in the second traveling rail 4 can enter the lift rail 51 and exit the lift rail 51 to the second downstream area AD2.

In the present embodiment, the first upstream area AU1 in the first traveling rail 3 includes a first passing point Pp1, a first entry point Pi1, and a first stop point Ps1. The first downstream area AD1 in the first traveling rail 3 includes a first exit point Po1.

The first passing point Pp1 indicates that a transport vehicle 2 traveling on the first traveling rail 3 is approaching the lift area AL. The first entry point Pi1 is set downstream from the first passing point Pp1 and indicates that the transport vehicle 2 has approached in front of the lift area AL. The first stop point Ps1 is set downstream from the first entry point Pi1 and indicates a point at which the transport vehicle 2 stops in front of the lift area AL. The first exit point Po1 indicates that the transport vehicle 2 has exited the lift area AL (lift rail 51).

Similarly, the second upstream area AU2 in the second traveling rail 4 includes a second passing point Pp2, a second entry point Pi2, and a second stop point Ps2. The second downstream area AD2 in the second traveling rail 4 includes a second exit point Po2.

The second passing point Pp2 indicates that a transport vehicle 2 traveling on the second traveling rail 4 is approaching the lift area AL. The second entry point Pi2 is set downstream from the second passing point Pp2 and indicates that the transport vehicle 2 has approached in front of the lift area AL. The second stop point Ps2 is set downstream from the second entry point Pi2 and indicates a point at which the transport vehicle 2 stops in front of the lift area AL. The second exit point Po2 indicates that the transport vehicle 2 has exited the lift area AL (lift rail 51).

In the present embodiment, the first upstream area AU1 in the first traveling rail 3 and the second upstream area AU2 in the second traveling rail 4 each include an entry request section ZI and a preliminary request section ZP.

In the entry request section ZI, a transport vehicle 2 in the section requests permission for entering the lift area AL (lift rail 51) from the control system 6. The entry request section ZI in the first upstream area AU1 is from the first entry point Pi1 to the first stop point Ps1. The entry request section ZI in the second upstream area AU2 is from the second entry point Pi2 to the second stop point Ps2. The transport vehicle 2 in the entry request section ZI (e.g., upon reaching the first entry point Pi1 or the second entry point Pi2) transmits an entry request signal Sdi to the control system 6.

In response to permission, the transport vehicle 2 in the entry request section ZI enters the lift area AL (passes through the first stop point Ps1 or the second stop point Ps2) and then transmits an exit request signal Sdo to the control system 6. In response to permission, the transport vehicle 2 exits the lift area AL, enters an area ahead (passes through the first exit point Po1 or the second exit point Po2), and transmits a main line entry notification signal Snr to the control system 6.

The preliminary request section ZP is set upstream from the entry request section ZI. In the preliminary request section ZP, a transport vehicle 2 in the section requests, before reaching the entry request section ZI, the control system 6 to move the lift rail 51 to an intended position being either the first position P1 or the second position P2. The preliminary request section ZP in the first upstream area AU1 is from the first passing point Pp1 to the first entry point Pi1. The preliminary request section ZP in the second upstream area AU2 is from the second passing point Pp2 to the second entry point Pi2. A transport vehicle 2 in the preliminary request section ZP (e.g., upon reaching the first passing point Pp1 or the second passing point Pp2) transmits a preliminary request signal Sdp to the control system 6.

In the present embodiment, a first sensor Se1, a second sensor Se2, and third sensors Se3 are installed in the lift area AL. The first sensor Se1 detects the lift rail 51 at the first position P1. The second sensor Se2 detects the lift rail 51 at the second position P2. The third sensors Se3 ascend and descend together with the lift rail 51 and detect a transport vehicle 2 on the lift rail 51. The first sensor Se1, the second sensor Se2, and the third sensors Se3 may be any sensors based on various detection principles including, for example, reflective or transmissive photoelectric sensors and laser sensors.

The control system 6 can determine the position of the lift rail 51 at a specific time point based on the detection results from the first sensor Se1 and the second sensor Se2. The control system 6 can determine whether the lift rail 51 is vacant at the specific time point based on the detection results from the third sensors Se3. The control system 6 determines, for example, whether to accept a preliminary request, whether to permit an entry request, or whether to permit an exit request from a transport vehicle 2 based on the position and the vacancy of the lift rail 51 at the specific time point.

To permit an entry request from a transport vehicle 2, the control system 6 transmits an entry permission signal Sai to the transport vehicle 2. To permit an exit request from a transport vehicle 2, the control system 6 transmits an exit permission signal Sao to the transport vehicle 2. To accept a preliminary request from a transport vehicle 2, the control system 6 transmits an operation command to the lifter 5.

Figure 4:
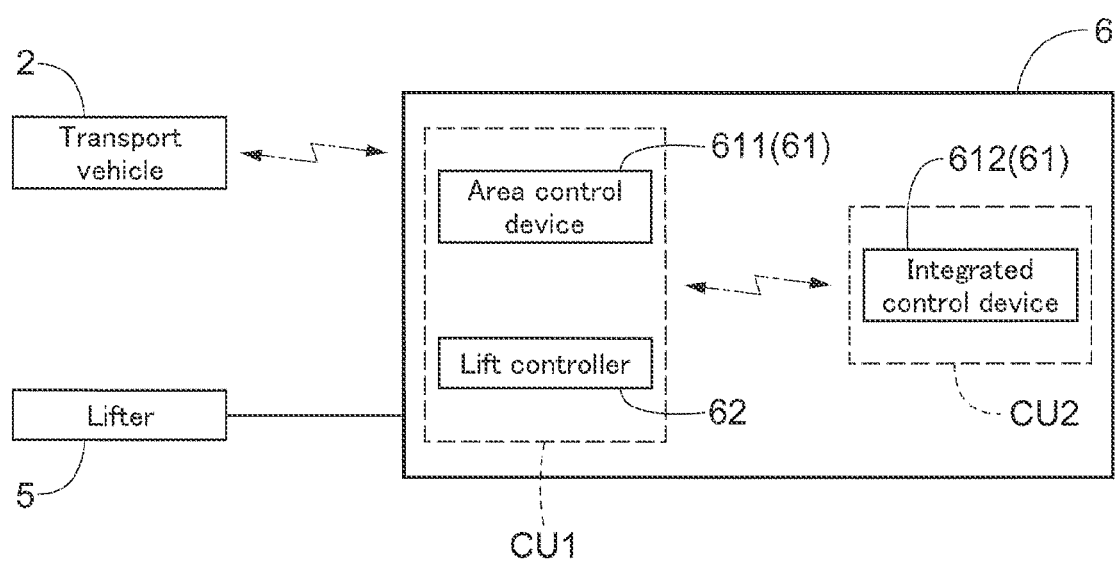
FIG. 4 is a block diagram of a control system.

The control system 6 controls the transport vehicles 2 and the lifter 5. As shown in FIG. 4, the control system 6 includes a host controller 61 and a lift controller 62. The host controller 61 includes an area control device 611 and an integrated control device 612. The host controller 61 controls the multiple transport vehicles 2 and the lift controller 62. The area control device 611 controls the lift controller 62 and the operations of multiple transport vehicles 2 in areas including the lifter 5 upstream and downstream from the lifter 5. The integrated control device 612 centrally controls the operations of the multiple transport vehicles 2 in the entire article transport facility 1. The integrated control device 612 can identify the estimated positions of the multiple transport vehicles 2 along the transport paths of the transport vehicles 2 based on information obtained by, for example, the transport vehicles 2 reading electronic tags or barcodes attached along the transport paths. The lift controller 62 controls the lifter 5.

As supplementarily indicated by the broken line in the functional block diagram of FIG. 4, the area control device 611 and the lift controller 62 are mounted on a first control unit CU1 in the present embodiment. The integrated control device 612 is mounted on a second control unit CU2 different from the first control unit CU1. The first control unit CU1 and the second control unit CU2 can communicate with each other.

The multiple transport vehicles 2, the lifter 5, and the control system 6 can communicate with one another. In the present embodiment, the transport vehicles 2 can communicate with the control system 6 (specifically, the host controller 61 in this example) through wireless communication (e.g., a wireless local area network, or LAN, compliant with the IEEE 802.11 standards such as Wi-Fi) using radio waves. The transport vehicles 2 can transmit various signals including the preliminary request signal Sdp, the entry request signal Sdi, and the exit request signal Sdo to the control system 6 (host controller 61) through wireless communication using radio waves. The control system 6 (host controller 61) can transmit various signals including the entry permission signal Sai and the exit permission signal Sao to the transport vehicles 2 through wireless communication using radio waves.

In the present embodiment, the lifter 5 can communicate with the control system 6 (specifically, the lift controller 62 in this example) through wired communication (e.g., actuator sensor interface, or AS-i) using a communication cable. The control system 6 (lift controller 62) can transmit an operation command for controlling the lifter 5 through wired communication using a communication cable.

Control over the transport vehicles 2 traveling from the first upstream area AU1 in the first traveling rail 3 or the second upstream area AU2 in the second traveling rail 4 to the first downstream area AD1 in the first traveling rail 3 or the second downstream area AD2 in the second traveling rail 4 through the lift area AL is described below.

Of the multiple transport vehicles 2, a transport vehicle 2 to be a target may be hereafter referred to as a target transport vehicle 2T, and transport vehicles 2 other than the target transport vehicle 2T may each be referred to as a non-target transport vehicle 2N. One of the first upstream area AU1 or the second upstream area AU2 including the target transport vehicle 2T may be referred to as a target upstream area AUT, and the other area not including the target transport vehicle 2T may be referred to as a non-target upstream area AUN. One of the first position P1 or the second position P2 corresponding to the target upstream area AUT may be referred to as a target position PT, and the other position different from the target position PT (in other words, corresponding to the non-target upstream area AUN) may be referred to as a non-target position PN. One of the first downstream area AD1 or the second downstream area AD2 through which the target transport vehicle 2T travels may be referred to as a target downstream area ADT, and the other area through which the target transport vehicle 2T does not travel may be referred to as a non-target downstream area ADN.

As shown in FIG. 5, when a target transport vehicle 2T reaches the preliminary request section ZP (step #01), the target transport vehicle 2T transmits a preliminary request signal Sdp to the host controller 61 (specifically, the area control device 611 in this example) (step #02). The target transport vehicle 2T continues to travel after transmitting the preliminary request signal Sdp. In response to the preliminary request signal Sdp from the target transport vehicle 2T, the host controller 61 determines whether to accept the preliminary request.

The host controller 61 determines not to accept the preliminary request from the target transport vehicle 2T when a non-target transport vehicle 2N is on the lift rail 51. In this case, the host controller 61 prioritizes the operation of the lifter 5 corresponding to the path for the non-target transport vehicle 2N on the lift rail 51. More specifically, the host controller 61 moves the lift rail 51 to either the first position P1 or the second position P2 corresponding to the target downstream area ADT for the non-target transport vehicle 2N.

The host controller 61 that has received an entry request signal Sdi from a non-target transport vehicle 2N also determines not to accept the preliminary request from the target transport vehicle 2T. In this case, the host controller 61 prioritizes the operation of the lifter 5 corresponding to the path for the non-target transport vehicle 2N that has transmitted the received entry request signal Sdi. More specifically, the host controller 61 moves the lift rail 51 to either the first position P1 or the second position P2 corresponding to the target upstream area AUT for the non-target transport vehicle 2N.

The host controller 61 determines to accept the preliminary request from the target transport vehicle 2T when no non-target transport vehicle 2N is on the lift rail 51 and no entry request signal Sdi is received from a non-target transport vehicle 2N. In this case, the host controller 61 transmits, to the target transport vehicle 2T, an acceptance signal Srp indicating that the host controller 61 accepts the preliminary request (step #03). The host controller 61 accepting the preliminary request basically performs a preliminary lifting process when the lift rail 51 is not at the target position PT (step #04). The preliminary lifting process is to preliminarily start moving the lift rail 51 to the target position PT before a target transport vehicle 2T reaches the entry request section ZI.

When the lift rail 51 is already at the target position PT, the host controller 61 accepting the preliminary request basically allows the lift rail 51 to remain at the target position PT.

The target transport vehicle 2T then reaches the entry request section ZI (step #05) and transmits an entry request signal Sdi to the host controller 61 (step #06). After transmitting the entry request signal Sdi, the target transport vehicle 2T continues to travel to the first stop point Ps1 or the second stop point Ps2. In response to the entry request signal Sdi from the target transport vehicle 2T, the host controller 61 determines whether to permit the entry request.

The host controller 61 does not permit the entry request from the target transport vehicle 2T when the lift rail 51 is not at the target position PT yet. The host controller 61 does not permit the entry request from the target transport vehicle 2T when a non-target transport vehicle 2N is on the lift rail 51. The host controller 61 permits the entry request from the target transport vehicle 2T when the lift rail 51 is at the target position PT and no non-target transport vehicle 2N is on the lift rail 51. In this case, the host controller 61 transmits an entry permission signal Sai to the target transport vehicle 2T (step #07).

In response to the entry permission signal Sai from the host controller 61, the target transport vehicle 2T passes through the first stop point Ps1 or the second stop point Ps2 and enters the lift rail 51 (step #08). Additionally, the target transport vehicle 2T transmits an exit request signal Sdo to the host controller 61 (step #09). In response to the exit request signal Sdo from the target transport vehicle 2T, the host controller 61 determines whether to permit the exit request.

The host controller 61 does not permit the exit request from the target transport vehicle 2T when the lift rail 51 is not at the first position P1 or the second position P2 that corresponds to the target downstream area ADT. The host controller 61 permits the exit request from the target transport vehicle 2T when the lift rail 51 is at the position corresponding to the target downstream area ADT. In this case, the host controller 61 transmits an exit permission signal Sao to the target transport vehicle 2T (step #10).

In response to the exit permission signal Sao from the host controller 61, the target transport vehicle 2T exits the lift rail 51, enters the target downstream area ADT, and continues to travel (step #11).

When passing through the first exit point Po1 or the second exit point Po2 (e.g., upon reading an electronic tag or a barcode at the point), the target transport vehicle 2T transmits, to the host controller 61, a main line entry notification signal Snr indicating that the target transport vehicle 2T has entered the target downstream area ADT (step #12). Upon receiving the main line entry notification signal Snr, the host controller 61 can determine that the target transport vehicle 2T has exited the lift rail 51 and actually entered the target downstream area ADT. In response to the main line entry notification signal Snr, the host controller 61 transmits, to the target transport vehicle 2T, an entry reply signal Srr indicating that the main line entry notification signal Snr has been received (step #13).

In these cases, the target transport vehicle 2T retransmits the preliminary request signal Sdp, the entry request signal Sdi, the exit request signal Sdo, and the main line entry notification signal Snr as appropriate. The target transport vehicle 2T transmits the preliminary request signal Sdp to the host controller 61 repeatedly at predetermined time intervals until the target transport vehicle 2T receives an acceptance signal Srp from the host controller 61. The target transport vehicle 2T transmits the entry request signal Sdi repeatedly at predetermined time intervals to the host controller 61 until the target transport vehicle 2T receives an entry permission signal Sai from the host controller 61. The target transport vehicle 2T transmits the exit request signal Sdo to the host controller 61 repeatedly at predetermined time intervals until the target transport vehicle 2T receives an exit permission signal Sao from the host controller 61. The target transport vehicle 2T transmits the main line entry notification signal Snr to the host controller 61 repeatedly at predetermined time intervals until the target transport vehicle 2T receives an entry reply signal Srr from the host controller 61.

When transmitting an exit permission signal Sao and then receiving no main line entry notification signal Snr from the target transport vehicle 2T within a predetermined period, the host controller 61 (specifically, the area control device 611 in this example) refers to the estimated position of the target transport vehicle 2T identified by the host controller 61 (specifically, the integrated control device 612 in this example). The host controller 61 then determines whether the target transport vehicle 2T has entered the target downstream area ADT based on the estimated position of the target transport vehicle 2T.

In the present embodiment, the host controller 61 accepting a preliminary request from a target transport vehicle 2T exceptionally stops the preliminary lifting process under predetermined conditions when the lift rail 51 is not at the target position PT. More specifically, when receiving an entry request signal Sdi from a non-target transport vehicle 2N after receiving a preliminary request signal Sdp from a target transport vehicle 2T and before receiving an entry request signal Sdi from the target transport vehicle 2T, the host controller 61 stops the preliminary lifting process despite the conditions for accepting the preliminary request being satisfied. In this case, the host controller 61 prioritizes the operation of the lifter 5 corresponding to the path for the non-target transport vehicle 2N that has transmitted the interrupting entry request signal Sdi. More specifically, the host controller 61 moves the lift rail 51 to either the first position P1 or the second position P2 corresponding to the target upstream area AUT for the non-target transport vehicle 2N.

FIGS. 6 to 11 show specific examples of a target transport vehicle 2T traveling from the first upstream area AU1 in the first traveling rail 3 or the second upstream area AU2 in the second traveling rail 4 to the first downstream area AD1 in the first traveling rail 3 or the second downstream area AD2 in the second traveling rail 4 through the lift area AL.

First Example

Figure 6:
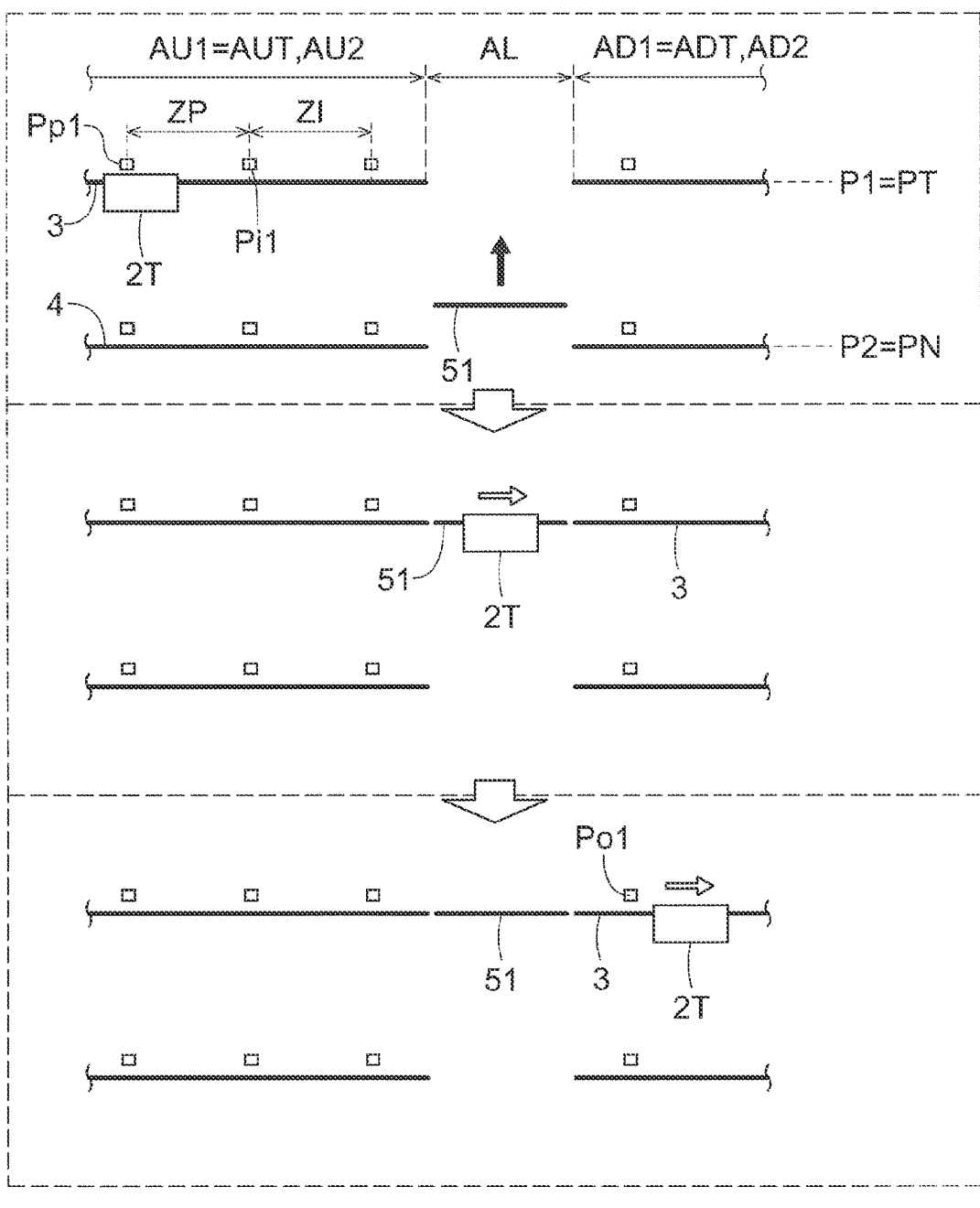
FIG. 6 is a diagram describing a transport vehicle traveling through the lift area (first example).

In a first example shown in FIG. 6, a target transport vehicle 2T traveling through the first upstream area AU1 in the first traveling rail 3 travels to the first downstream area AD1 in the first traveling rail 3 through the lift area AL. In the first example, no other transport vehicles 2 are between the target transport vehicle 2T and the lifter 5, and the lift rail 51 is initially vacant at the second position P2. In this example, the first upstream area AU1 is the target upstream area AUT, the first position P1 is the target position PT, the second position P2 is the non-target position PN, and the first downstream area AD1 is the target downstream area ADT.

When reaching the preliminary request section ZP (passing through the first passing point Pp1), the target transport vehicle 2T transmits a preliminary request signal Sdp. In this example, no non-target transport vehicle 2N is on the lift rail 51, the lift rail 51 is at the second position P2 that is the non-target position PN, and no other preliminary request signals Sdp are transmitted from the non-target transport vehicles 2N. The host controller 61 thus controls the lifter 5 with the lift controller 62 to cause the lift rail 51 to ascend to the first position P1 that is the target position PT (in other words, performs the preliminary lifting process).

The target transport vehicle 2T then transmits an entry request signal Sdi when reaching the entry request section ZI (passing through the first entry point Pi1). In this example, no non-target transport vehicle 2N is on the lift rail 51. Thus, when the lift rail 51 reaches the first position P1, the host controller 61 transmits an entry permission signal Sai to the target transport vehicle 2T.

The target transport vehicle 2T enters the lift rail 51 and transmits an exit request signal Sdo at the same time. In this example, the lift rail 51 is already at the first position P1 corresponding to the target downstream area ADT (the first downstream area AD1 in this example). The host controller 61 thus transmits an exit permission signal Sao to the target transport vehicle 2T. The target transport vehicle 2T then exits the lift rail 51 and travels on the first traveling rail 3 again. When passing through the first exit point Po1, the target transport vehicle 2T transmits a main line entry notification signal Snr. The host controller 61 receiving the main line entry notification signal Snr transmits an entry reply signal Srr to the target transport vehicle 2T.

Second Example

Figure 7:
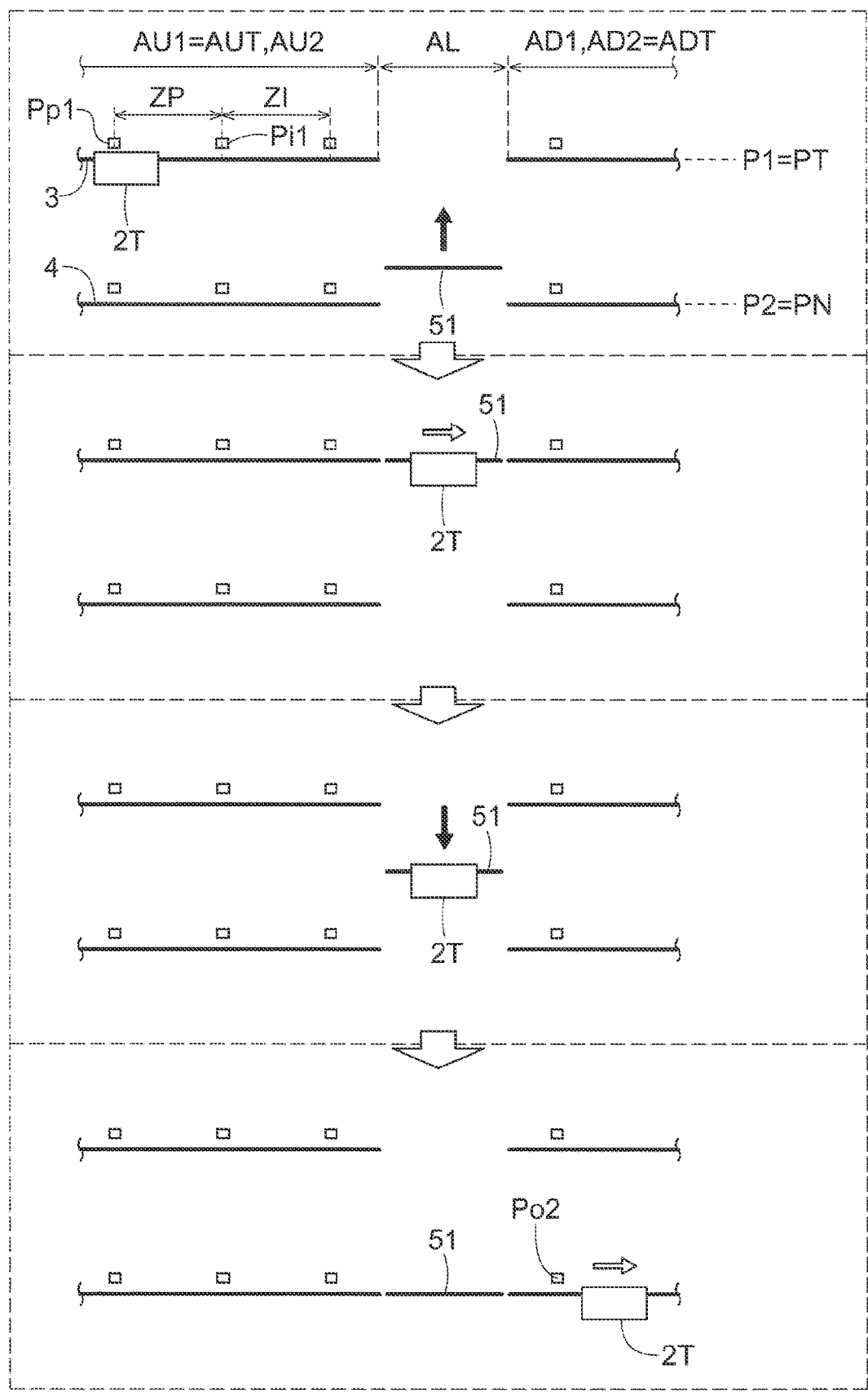
FIG. 7 is a diagram describing a transport vehicle traveling through the lift area (second example).

In a second example shown in FIG. 7, a target transport vehicle 2T traveling through the first upstream area AU1 in the first traveling rail 3 travels to the second downstream area AD2 in the second traveling rail 4 through the lift area AL. In the second example, no other transport vehicles 2 are between the target transport vehicle 2T and the lifter 5, and the lift rail 51 is initially vacant at the second position P2. In this example, the first upstream area AU1 is the target upstream area AUT, the first position P1 is the target position PT, the second position P2 is the non-target position PN, and the second downstream area AD2 is the target downstream area ADT.

When reaching the preliminary request section ZP (passing through the first passing point Pp1), the target transport vehicle 2T transmits a preliminary request signal Sdp. In this example, no non-target transport vehicle 2N is on the lift rail 51, the lift rail 51 is at the second position P2 that is the non-target position PN, and no other preliminary request signals Sdp are transmitted from the non-target transport vehicles 2N. The host controller 61 thus controls the lifter 5 with the lift controller 62 to cause the lift rail 51 to ascend to the first position P1 that is the target position PT (in other words, performs the preliminary lifting process).

The target transport vehicle 2T then transmits an entry request signal Sdi when reaching the entry request section ZI (passing through the first entry point Pi1). In this example, no non-target transport vehicle 2N is on the lift rail 51. Thus, when the lift rail 51 reaches the first position P1, the host controller 61 transmits an entry permission signal Sai to the target transport vehicle 2T.

The target transport vehicle 2T enters the lift rail 51 and transmits an exit request signal Sdo at the same time. In this example, the lift rail 51 is at the first position P1 corresponding to the non-target downstream area ADN (the first downstream area AD1 in this example). The host controller 61 thus defers transmitting an exit permission signal Sao. The host controller 61 then controls the lifter 5 with the lift controller 62 to cause the lift rail 51 carrying the target transport vehicle 2T to descend to the second position P2 corresponding to the target downstream area ADT (the second downstream area AD2 in this example). When the lift rail 51 reaches the second position P2, the host controller 61 transmits an exit permission signal Sao to the target transport vehicle 2T. The target transport vehicle 2T then exits the lift rail 51 and travels on the second traveling rail 4. When passing through the second exit point Po2, the target transport vehicle 2T transmits a main line entry notification signal Snr. The host controller 61 receiving the main line entry notification signal Snr transmits an entry reply signal Srr to the target transport vehicle 2T.

Third Example

Figure 8:
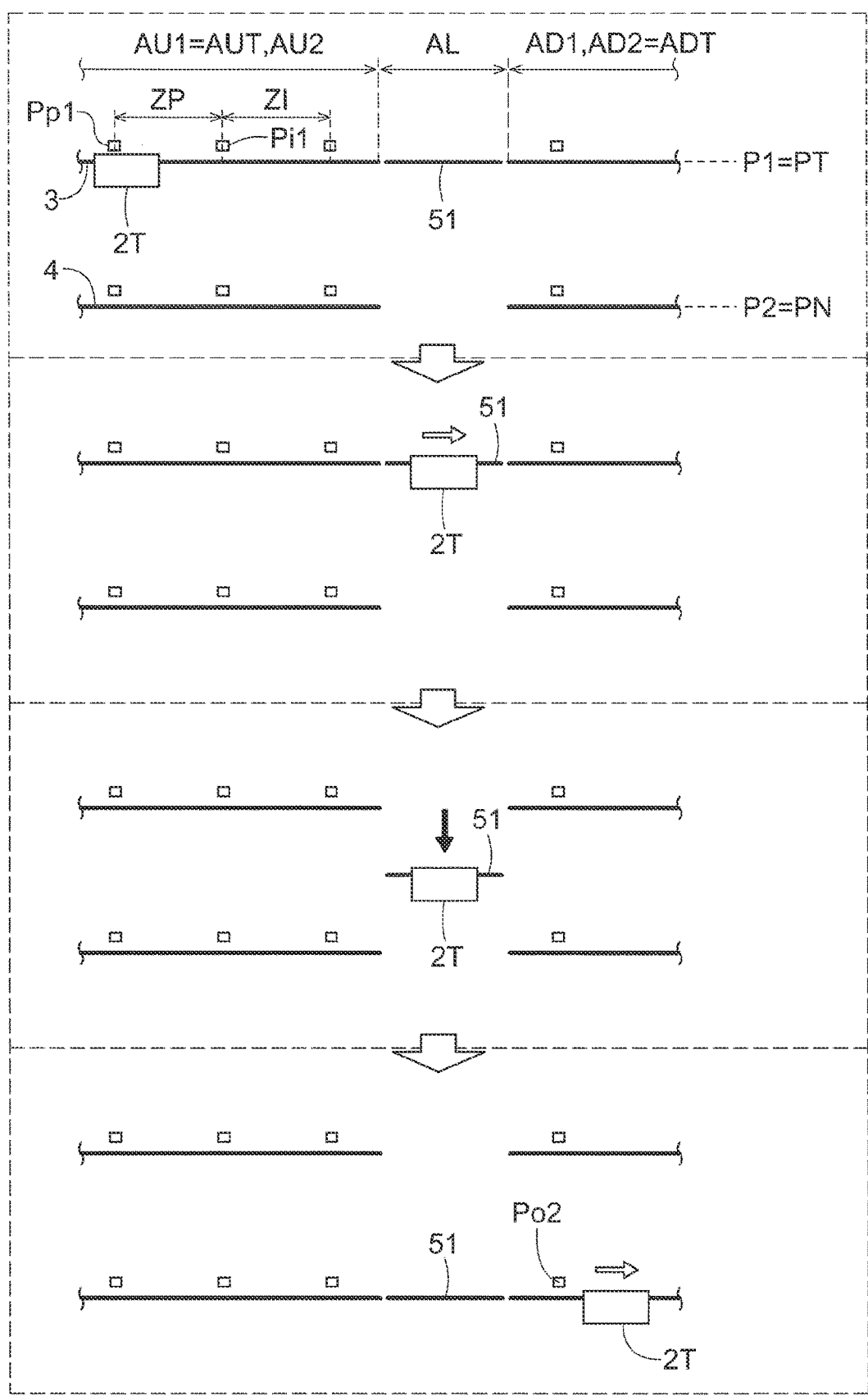
FIG. 8 is a diagram describing a transport vehicle traveling through the lift area (third example).

In a third example shown in FIG. 8, a target transport vehicle 2T traveling through the first upstream area AU1 in the first traveling rail 3 travels to the second downstream area AD2 in the second traveling rail 4 through the lift area AL. In the third example, no other transport vehicles 2 are between the target transport vehicle 2T and the lifter 5, and the lift rail 51 is initially vacant at the first position P1. In this example, the first upstream area AU1 is the target upstream area AUT, the first position P1 is the target position PT, the second position P2 is the non-target position PN, and the second downstream area AD2 is the target downstream area ADT.

When reaching the preliminary request section ZP (passing through the first passing point Pp1), the target transport vehicle 2T transmits a preliminary request signal Sdp. In this example, the lift rail 51 is already at the first position P1 that is the target position PT. The host controller 61 thus allows the lift rail 51 to remain at the first position P1 without additionally performing control over the lifter 5.

The target transport vehicle 2T then transmits an entry request signal Sdi when reaching the entry request section ZI (passing through the first entry point Pi1). In this example, the lift rail 51 is already at the first position P1, and no non-target transport vehicle 2N is on the lift rail 51. The host controller 61 thus transmits an entry permission signal Sai to the target transport vehicle 2T.

The target transport vehicle 2T enters the lift rail 51 and transmits an exit request signal Sdo at the same time. In this example, the lift rail 51 is at the first position P1 corresponding to the non-target downstream area ADN (the first downstream area AD1 in this example). The host controller 61 thus defers transmitting an exit permission signal Sao. The host controller 61 then controls the lifter 5 with the lift controller 62 to cause the lift rail 51 carrying the target transport vehicle 2T to descend to the second position P2 corresponding to the target downstream area ADT (the second downstream area AD2 in this example). When the lift rail 51 reaches the second position P2, the host controller 61 transmits an exit permission signal Sao to the target transport vehicle 2T. The target transport vehicle 2T then exits the lift rail 51 and travels on the second traveling rail 4. When passing through the second exit point Po2, the target transport vehicle 2T transmits a main line entry notification signal Snr. The host controller 61 receiving the main line entry notification signal Snr transmits an entry reply signal Srr to the target transport vehicle 2T.

Fourth Example

Figure 9:
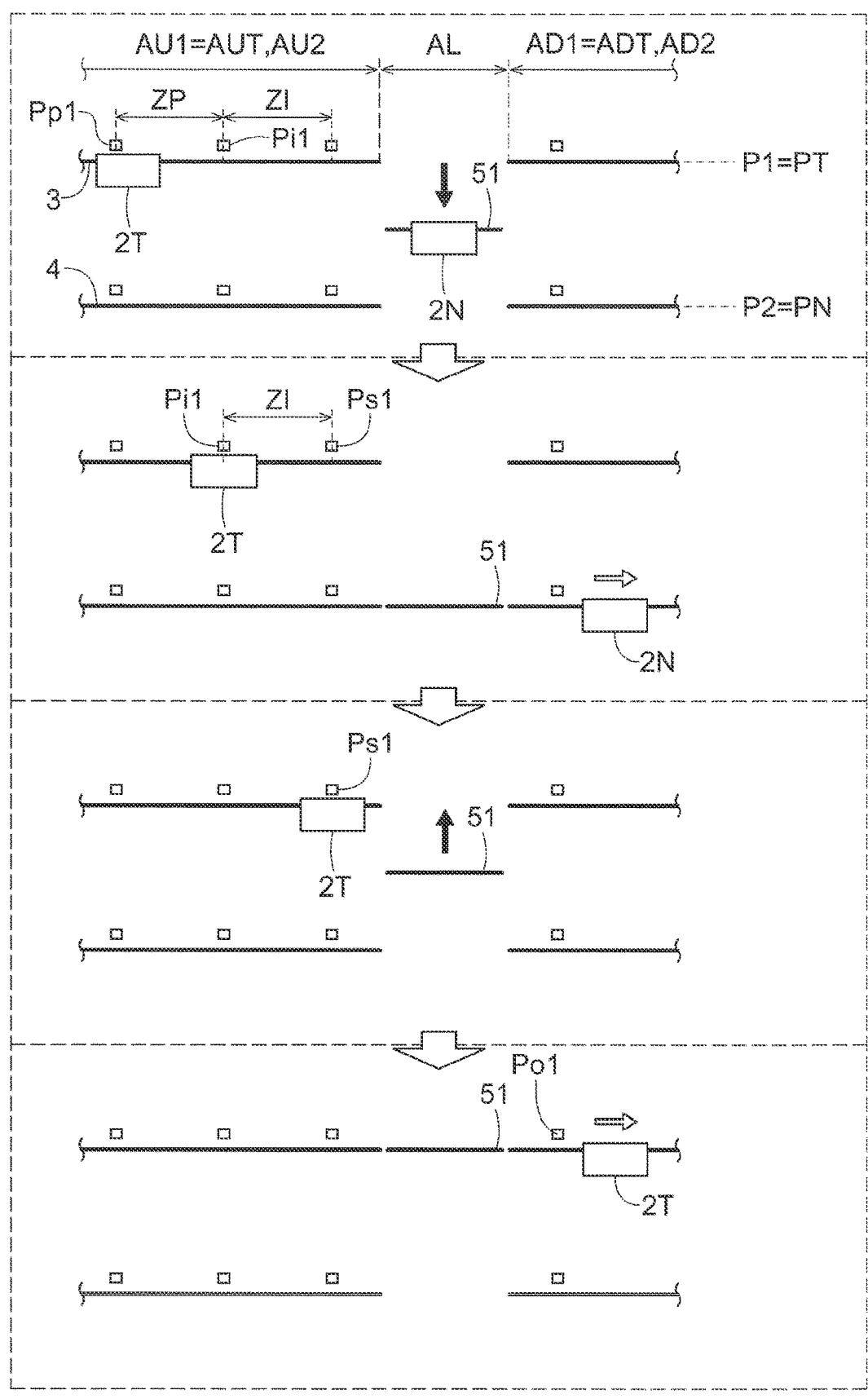
FIG. 9 is a diagram describing a transport vehicle traveling through the lift area (fourth example).

In a fourth example shown in FIG. 9, a target transport vehicle 2T traveling through the first upstream area AU1 in the first traveling rail 3 travels to the first downstream area AD1 in the first traveling rail 3 through the lift area AL. In the fourth example, no other transport vehicles 2 are on the first traveling rail 3 and the second traveling rail 4 between the target transport vehicle 2T and the lifter 5, but the lift rail 51 carrying another transport vehicle 2 is descending toward the second position P2. In this example, the first upstream area AU1 is the target upstream area AUT, the first position P1 is the target position PT, the second position P2 is the non-target position PN, and the first downstream area AD1 is the target downstream area ADT.

When reaching the preliminary request section ZP (passing through the first passing point Pp1), the target transport vehicle 2T transmits a preliminary request signal Sdp. In this example, a non-target transport vehicle 2N is on the lift rail 51. The host controller 61 thus allows the lift rail 51 to continue to descend to the second position P2 without additionally performing control over the lifter 5.

The target transport vehicle 2T then transmits an entry request signal Sdi when reaching the entry request section ZI (passing through the first entry point Pi1). In this example, the non-target transport vehicle 2N is on the lift rail 51 or the lift rail 51 is at least at the second position P2 that is the non-target position PN when no non-target transport vehicle 2N is on the lift rail 51. The host controller 61 thus defers transmitting an entry permission signal Sai to the target transport vehicle 2T. During this time, the target transport vehicle 2T waits at the first stop point Ps1. When the preceding non-target transport vehicle 2N exits the lift rail 51 and the vacant lift rail 51 ascends to reach the first position P1 that is the target position PT, the host controller 61 transmits an entry permission signal Sai to the target transport vehicle 2T.

The target transport vehicle 2T enters the lift rail 51 and transmits an exit request signal Sdo at the same time. In this example, the lift rail 51 is already at the first position P1 corresponding to the target downstream area ADT (the first downstream area AD1 in this example). The host controller 61 thus transmits an exit permission signal Sao to the target transport vehicle 2T. The target transport vehicle 2T then exits the lift rail 51 and travels on the first traveling rail 3 again. When passing through the first exit point Po1, the target transport vehicle 2T transmits a main line entry notification signal Snr. The host controller 61 receiving the main line entry notification signal Snr transmits an entry reply signal Srr to the target transport vehicle 2T.

Fifth Example

Figure 10:
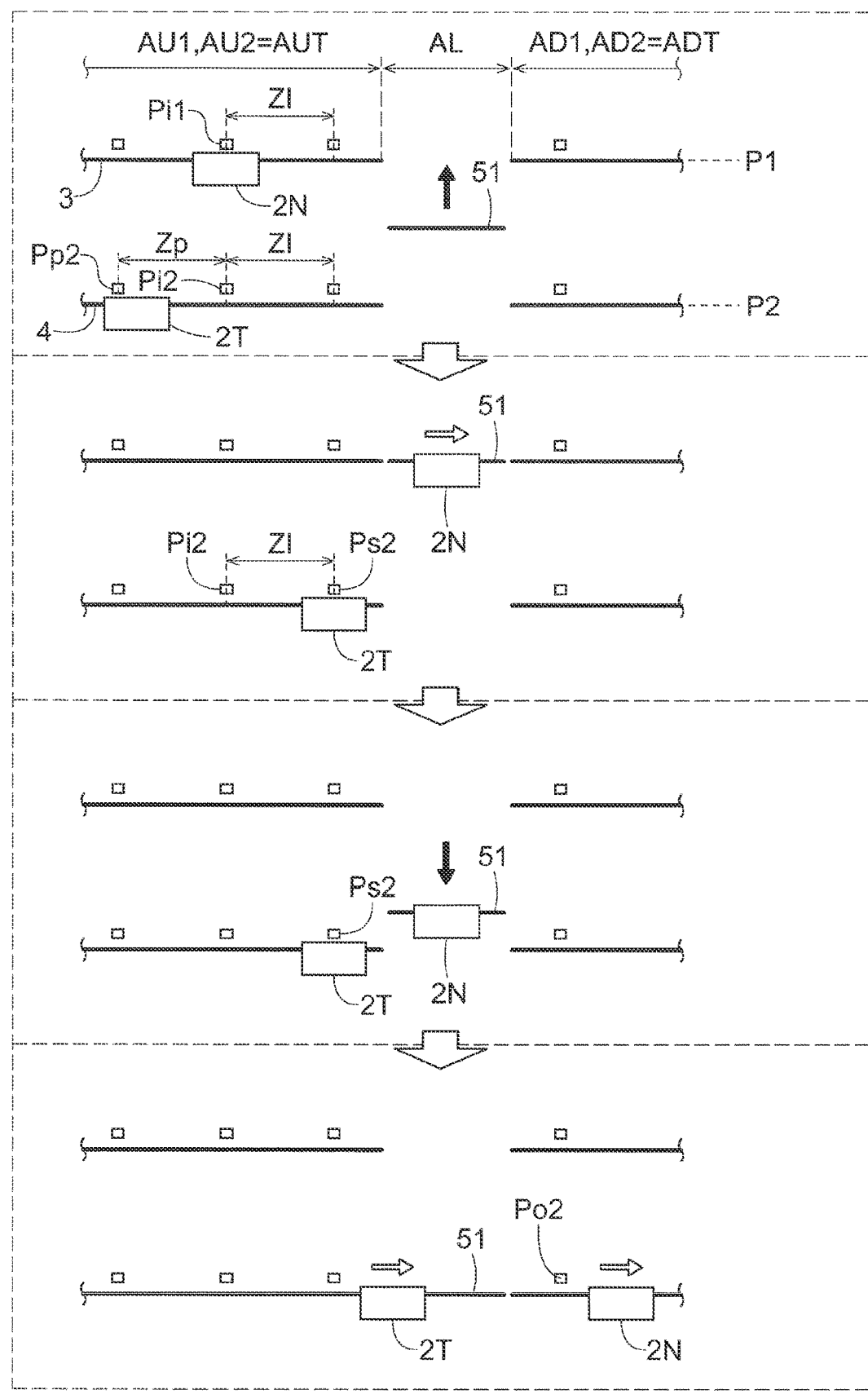
FIG. 10 is a diagram describing a transport vehicle traveling through the lift area (fifth example).

In a fifth example shown in FIG. 10, a target transport vehicle 2T traveling through the second upstream area AU2 in the second traveling rail 4 travels to the second downstream area AD2 in the second traveling rail 4 through the lift area AL. In the fifth example, a non-target transport vehicle 2N travels on the first traveling rail 3 between the target transport vehicle 2T and the lifter 5 (more specifically, in the entry request section ZI). In this example, the second upstream area AU2 is the target upstream area AUT, the second position P2 is the target position PT, the first position P1 is the non-target position PN, and the second downstream area AD2 is the target downstream area ADT.

When reaching the preliminary request section ZP (passing through the second passing point Pp2), the target transport vehicle 2T transmits a preliminary request signal Sdp. In this example, the preceding non-target transport vehicle 2N is already in the entry request section ZI, and an entry request signal Sdi is transmitted from the non-target transport vehicle 2N. The host controller 61 allows the lift rail 51 to continue to move based on a preliminary request signal Sdp from the non-target transport vehicle 2N without additionally performing control over the lifter 5. In the illustrated example, the lift rail 51 continues to ascend toward the first position P1 that is the target position PT for the non-target transport vehicle 2N in the entry request section ZI.

The target transport vehicle 2T then transmits an entry request signal Sdi when reaching the entry request section ZI (passing through the second entry point Pi2). In this example, the preceding non-target transport vehicle 2N is on the lift rail 51. The host controller 61 thus defers transmitting an entry permission signal Sai to the target transport vehicle 2T. During this time, the target transport vehicle 2T waits at the second stop point Ps2. When the preceding non-target transport vehicle 2N exits the lift rail 51 and the vacant lift rail 51 finally reaches the second position P2 that is the target position PT, the host controller 61 transmits an entry permission signal Sai to the target transport vehicle 2T.

The target transport vehicle 2T enters the lift rail 51 and transmits an exit request signal Sdo at the same time. In this example, the lift rail 51 is already at the second position P2 corresponding to the target downstream area ADT (the second downstream area AD2 in this example). The host controller 61 thus transmits an exit permission signal Sao to the target transport vehicle 2T. The target transport vehicle 2T then exits the lift rail 51 and travels on the second traveling rail 4 again. When passing through the second exit point Po2, the target transport vehicle 2T transmits a main line entry notification signal Snr. The host controller 61 receiving the main line entry notification signal Snr transmits an entry reply signal Srr to the target transport vehicle 2T.

Sixth Example

Figure 11:
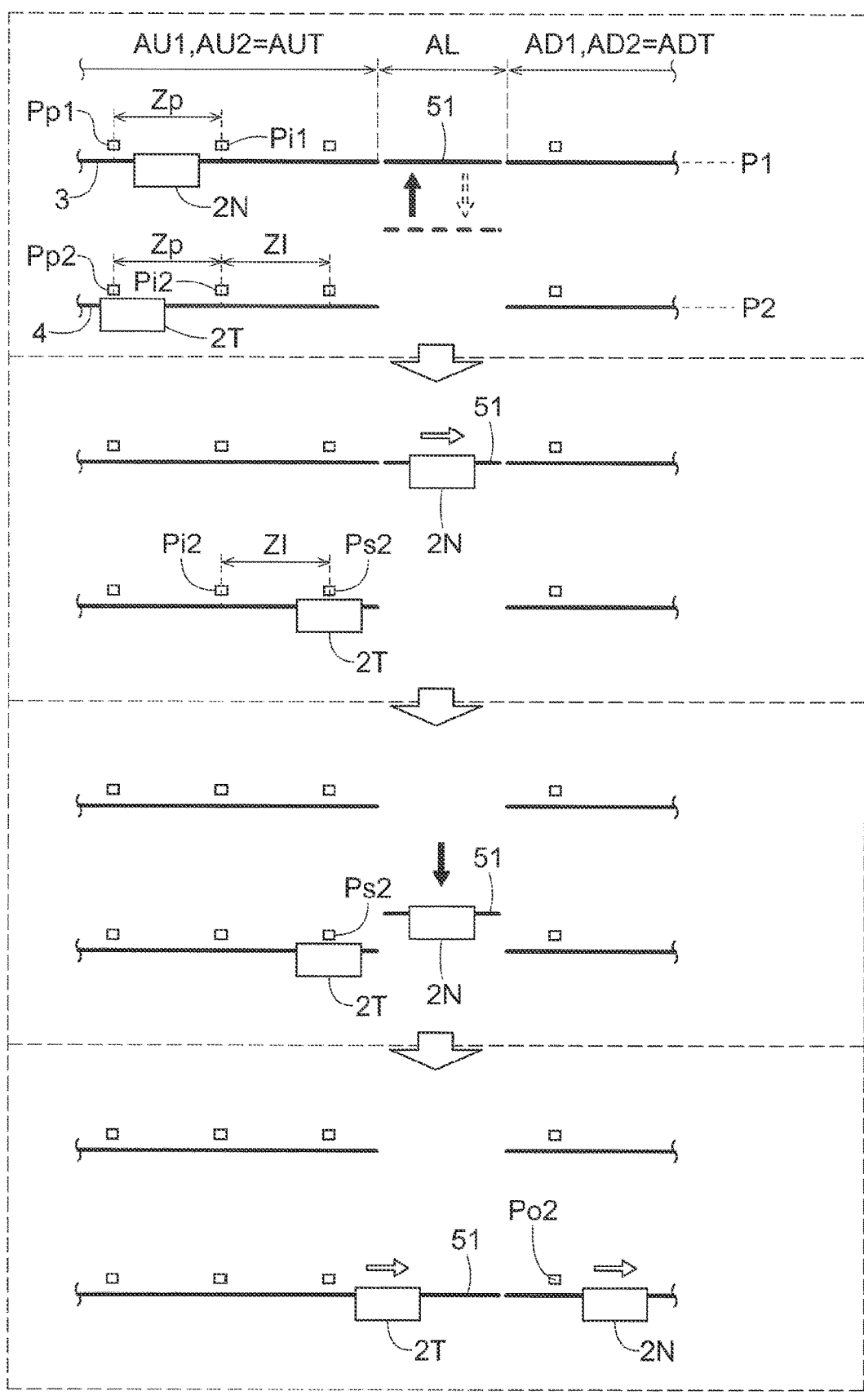
FIG. 11 is a diagram describing a transport vehicle traveling through the lift area (sixth example).

In a sixth example shown in FIG. 11, a target transport vehicle 2T traveling through the second upstream area AU2 in the second traveling rail 4 travels to the second downstream area AD2 in the second traveling rail 4 through the lift area AL. In the sixth example, a non-target transport vehicle 2N travels on the first traveling rail 3 between the target transport vehicle 2T and the lifter 5 (more specifically, in the preliminary request section ZP). In this example, the second upstream area AU2 is the target upstream area AUT, the second position P2 is the target position PT, the first position P1 is the non-target position PN, and the second downstream area AD2 is the target downstream area ADT.

When reaching the preliminary request section ZP (passing through the second passing point Pp2), the target transport vehicle 2T transmits a preliminary request signal Sdp. In this example, no non-target transport vehicle 2N is on the lift rail 51, the lift rail 51 is at the first position P1 being the non-target position PN, and the preceding non-target transport vehicle 2N is yet to transmit an entry request signal Sdi.

The host controller 61 thus controls the lifter 5 with the lift controller 62 to cause the lift rail 51 to start descending to the second position P2 that is the target position PT (in other words, starts the preliminary lifting process).

In this example, however, the preceding non-target transport vehicle 2N shortly reaches the entry request section ZI (passes through the first entry point Pi1) first and transmits an entry request signal Sdi first. The host controller 61 receiving the entry request signal Sdi from the non-target transport vehicle 2N stops the preliminary lifting process for the target transport vehicle 2T and prioritizes the operation control of the lifter 5 based on the entry request from the non-target transport vehicle 2N. In this example, the host controller 61 causes the lift rail 51 to ascend to the first position P1 that is the target position PT for the non-target transport vehicle 2N and controls the operation of the lifter 5 corresponding to the subsequent path for the non-target transport vehicle 2N.

The target transport vehicle 2T transmits an entry request signal Sdi when reaching the entry request section ZI (passing through the second entry point Pi2). In this example, the preceding non-target transport vehicle 2N is on the lift rail 51. The host controller 61 thus defers transmitting an entry permission signal Sai to the target transport vehicle 2T. During this time, the target transport vehicle 2T waits at the second stop point Ps2. When the lift rail 51 reaches the second position P2 that is the target position PT and the preceding non-target transport vehicle 2N exits the lift rail 51, the host controller 61 transmits an entry permission signal Sai to the target transport vehicle 2T.

The target transport vehicle 2T enters the lift rail 51 and transmits an exit request signal Sdo at the same time. In this example, the lift rail 51 is already at the second position P2 corresponding to the target downstream area ADT (the second downstream area AD2 in this example). The host controller 61 thus transmits an exit permission signal Sao to the target transport vehicle 2T. The target transport vehicle 2T then exits the lift rail 51 and travels on the second traveling rail 4 again. When passing through the second exit point Po2, the target transport vehicle 2T transmits a main line entry notification signal Snr. The host controller 61 receiving the main line entry notification signal Snr transmits an entry reply signal Srr to the target transport vehicle 2T.

Other Embodiments (1) In the above embodiments, the control system 6 receiving a preliminary request from the target transport vehicle 2T and then an entry request signal Sdi from a non-target transport vehicle 2N before receiving another signal prioritizes the operation of the lifter 5 corresponding to the path for the non-target transport vehicle 2N. In some embodiments, for example, the control system 6 may prioritize a request received first (the preliminary request from the target transport vehicle 2T). In some embodiments, processes may be prioritized to allow the control system 6 to perform the processes in an order that minimizes the total processing time.

(2) In the above embodiments, the control system 6 includes the host controller 61 and the lift controller 62. In some embodiments, the control system 6 may further include another functional component or may include a functional component serving as both the host controller 61 and the lift controller 62.

(3) In the above embodiments, the transport vehicles 2, the host controller 61, and the lift controller 62 can communicate through wireless communication using radio waves, and the lifter 5 and the lift controller 62 can communicate through wired communication using a communication cable. In some embodiments, any of various methods may be used for communication between the components.

(4) In the above embodiments, the target transport vehicle 2T transmits a main line entry notification signal Snr when passing through the first exit point Po1 or the second exit point Po2, and upon receiving the main line entry notification signal Snr, the host controller 61 determines that the target transport vehicle 2T has entered the target downstream area ADT. In some embodiments, the target transport vehicle 2T may transmit no main line entry notification signal Snr. In this case, the determination as to whether the target transport vehicle 2T has entered the target downstream area ADT may be performed based on the estimated position of the target transport vehicle 2T identified by the integrated control device 612. In some embodiments, presence sensors similar to, for example, the third sensors Se3 may be installed near the entrances of the first downstream area AD1 in the first traveling rail 3 and the second downstream area AD2 in the second traveling rail 4.

(5) In the above embodiments, the transport vehicles 2 travel in the same direction on the first traveling rail 3 and on the second traveling rail 4. In some embodiments, the transport vehicles 2 may travel in the opposite directions on the first traveling rail 3 and on the second traveling rail 4. In this case, the first upstream area AU1 and the second downstream area AD2 are located adjacent to one end of the lift area AL, and the first downstream area AD1 and the second upstream area AU2 are located adjacent to the other end of the lift area AL. When moving between the first traveling rail 3 and the second traveling rail 4 with the lifter 5, each transport vehicle 2 is to U-turn while changing its vertical position in the lift area AL.

(6) In the above embodiments, the area control device 611 and the lift controller 62 are mounted on the first control unit CU1, and the integrated control device 612 is mounted on the second control unit CU2. In some embodiments, for example, the area control device 611 and the integrated control device 612 may be mounted on the first control unit, and the lift controller 62 may be mounted on the second control unit. In some embodiments, the area control device 611, the integrated control device 612, and the lift controller 62 may be all mounted on a single control unit. In some embodiments, the area control device 611, the integrated control device 612, and the lift controller 62 may each be mounted on an independent control unit. In this manner, the control system 6 may have a hardware configuration with any specifications that achieve the intended functions of the entire system.

(7) The structure described in each of the above embodiments (including the above embodiments and other embodiments; the same applies hereafter) may be combined with any other structures described in the other embodiments unless any contradiction arises. The embodiments described herein are merely illustrative in all respects and may be modified as appropriate without departing from the spirit and scope of the present disclosure.

Overview of Embodiments

The article transport facility according to one or more embodiments of the present disclosure may have the structure overviewed below.

An article transport facility according to an embodiment of the present disclosure includes a plurality of transport vehicles that transport articles, a first traveling rail for the plurality of transport vehicles to travel, a second traveling rail below the first traveling rail and being a rail for the plurality of transport vehicles to travel, a lifter that lifts and lowers the plurality of transport vehicles between the first traveling rail and the second traveling rail, and a control system that controls the plurality of transport vehicles and the lifter. The first traveling rail includes a first upstream area and a first downstream area discontinuous from each other. The first upstream area is upstream from a lift area in which the lifter is located, and the first downstream area is downstream from the lift area. The second traveling rail includes a second upstream area and a second downstream area discontinuous from each other. The second upstream area is upstream from the lift area, and the second downstream area is downstream from the lift area. The lifter includes a lift rail for the plurality of transport vehicles to travel. The lift rail ascends and descends in the lift area. The lift rail at a first position connects the first upstream area and the first downstream area in the first traveling rail. The lift rail at a second position connects the second upstream area and the second downstream area in the second traveling rail. The plurality of transport vehicles in an entry request section transmit an entry request signal to the control system to request permission for entering the lift rail. The plurality of transport vehicles in a preliminary request section transmit a preliminary request signal to the control system. The entry request section is defined in each of the first upstream area and the second upstream area. The preliminary request section is defined upstream from the entry request section in each of the first upstream area and the second upstream area. The plurality of transport vehicles include a target transport vehicle and a non-target transport vehicle other than the target transport vehicle. In response to the entry request signal from the target transport vehicle, the control system transmits an entry permission signal to the target transport vehicle to permit entry into the lift rail when the lift rail is at a target position and no non-target transport vehicle is on the lift rail, where the target position is one of the first position or the second position corresponding to a target upstream area, the other of the first position or the second position not being the target position is a non-target position, and the target upstream area is one of the first upstream area or the second upstream area including the target transport vehicle. In response to the preliminary request signal from the target transport vehicle, the control system performs a preliminary lifting process of moving the lift rail not at the target position to the target position when no non-target transport vehicle is on the lift rail and no entry request signal is received from the non-target transport vehicle.

In this structure, the target transport vehicle in the preliminary request section upstream from the entry request section transmits a preliminary request signal to the control system before transmitting an entry request signal. The control system can thus expect that the target transport vehicle is to travel on the lift rail. When the lift rail is not at the target position, the control system receiving the preliminary request signal can move the lift rail to the target position in advance without interrupting other traveling non-target transport vehicles. Thus, the target transport vehicle to pass the lift rail may wait a shorter period in front of the lift rail before being allowed to enter the lift rail. The target transport vehicle can travel more efficiently in the lift area. This improves the transport efficiency of the entire article transport facility.

In one embodiment, in response to the preliminary request signal from the target transport vehicle, the control system may allow the lift rail at the target position to remain at the target position when receiving no entry request signal from the non-target transport vehicle.

In this structure, when the lift rail is at the target position, the control system receiving the preliminary request signal allows the lift rail to remain at the target position to prepare for the incoming target transport vehicle without interrupting other traveling non-target transport vehicles. Thus, the target transport vehicle to pass through the lift rail may wait a shorter period in front of the lift rail, independently of the position of the lift rail when the target transport vehicle reaches the preliminary request section. Thus, the target transport vehicle can travel more efficiently in the lift area.

In one embodiment, when the non-target transport vehicle is on the lift rail, the control system may prioritize an operation of the lifter corresponding to a path for the non-target transport vehicle on the lift rail over the preliminary lifting process, and when no non-target transport vehicle is on the lift rail, the control system may prioritize an operation of the lifter corresponding to the path for the non-target transport vehicle over the preliminary lifting process in response to the entry request signal from the non-target transport vehicle received after the preliminary request signal from the target transport vehicle and before the entry request signal from the target transport vehicle.

This structure reduces the likelihood that the preliminary lifting process interrupts other traveling non-target transport vehicles that are to pass through the lift rail. Thus, the multiple transport vehicles including the non-target transport vehicles as well as the target transport vehicle can collectively travel more efficiently, improving the transport efficiency of the entire article transport facility.

In one embodiment, the target transport vehicle may enter the lift rail in response to the entry permission signal, and after entering the lift rail, transmit an exit request signal to the control system to request permission for entering a target downstream area, where the target downstream area is one of the first downstream area or the second downstream area to which the target transport vehicle travels. Upon receiving the exit request signal from the target transport vehicle, the control system may transmit an exit permission signal to the target transport vehicle to permit entry into the target downstream area when the lift rail is at one of the first position or the second position corresponding to the target downstream area. The target transport vehicle may exit the lift rail and enter the target downstream area in response to the exit permission signal.

This structure allows the target transport vehicle to appropriately enter the lift rail and then travel to the target downstream area. This allows the target transport vehicle to appropriately pass through the lift rail.

In one embodiment, after exiting the lift rail, the target transport vehicle may transmit, to the control system, a main line entry notification signal indicating that the target transport vehicle has entered the target downstream area.

In this structure, the control system can determine that the target transport vehicle has exited the lift rail and actually entered the target downstream area upon receiving the main line entry notification signal. This eliminates a presence sensor for detecting the transport vehicles in the first downstream area and the second downstream area and can reduce cost.

In one embodiment, the control system may identify an estimated position of each of the plurality of transport vehicles along a transport path of the transport vehicle, and determine whether the target transport vehicle has entered the target downstream area based on the estimated position of the target transport vehicle when the control system receives no main line entry notification signal from the target transport vehicle within a predetermined period after transmitting the exit permission signal to the target transport vehicle.

In this structure, the control system failing to receive a main line entry notification signal due to, for example, communication errors may avoid erroneously determining that no transport vehicle has entered the target downstream area yet. This avoids a decrease in the transport efficiency of the entire article transport facility.

In one embodiment, the control system may include a lift controller to control the lifter and a host controller to control the plurality of transport vehicles and the lift controller. The plurality of transport vehicles may transmit or receive signals to or from the host controller through wireless communication using radio waves.

In this structure, the host controller transmitting or receiving signals to or from the multiple transport vehicles through wireless communication using radio waves can appropriately control each transport vehicle. Positional information about the transport vehicles may also be obtained without separately installing hardware for a communication device such as an optical communication device. Thus, the entry request section and the preliminary request section can be set more freely without hardware restrictions, and the article transport facility can be less costly.

The article transport facility according to one or more embodiments of the present disclosure may produce at least one of the effects described above.

What is claimed is:

1. An article transport facility, comprising:
   a plurality of transport vehicles configured to transport articles;
   a first traveling rail for the plurality of transport vehicles to travel;
   a second traveling rail below the first traveling rail, wherein the second traveling rail is a rail for the plurality of transport vehicles to travel;
   a lifter configured to lift and lower the plurality of transport vehicles between the first traveling rail and the second traveling rail; and
   a control system configured to control the plurality of transport vehicles and the lifter, and
   wherein:
   the first traveling rail comprises a first upstream area and a first downstream area discontinuous from each other, the first upstream area is upstream from a lift area in which the lifter is located, and the first downstream area is downstream from the lift area,
   the second traveling rail comprises a second upstream area and a second downstream area discontinuous from each other, the second upstream area is upstream from the lift area, and the second downstream area is downstream from the lift area,
   the lifter comprises a lift rail for the plurality of transport vehicles to travel, and the lift rail ascends and descends in the lift area,
   the lift rail at a first position connects the first upstream area and the first downstream area in the first traveling rail, and the lift rail at a second position connects the second upstream area and the second downstream area in the second traveling rail,
   the plurality of transport vehicles in an entry request section transmit an entry request signal to the control system to request permission for entering the lift rail, the plurality of transport vehicles in a preliminary request section transmit a preliminary request signal to the control system, the entry request section is defined in each of the first upstream area and the second upstream area, and the preliminary request section is defined upstream from the entry request section in each of the first upstream area and the second upstream area, the plurality of transport vehicles comprise a target transport vehicle and a non-target transport vehicle other than the target transport vehicle, in response to the entry request signal from the target transport vehicle, the control system transmits an entry permission signal to the target transport vehicle to permit entry into the lift rail when the lift rail is at a target position and no non-target transport vehicle is on the lift rail, where the target position is one of the first position or the second position corresponding to a target upstream area, the other of the first position or the second position not being the target position is a non-target position, and the target upstream area is one of the first upstream area or the second upstream area comprising the target transport vehicle, and in response to the preliminary request signal from the target transport vehicle, the control system performs a preliminary lifting process of moving the lift rail not at the target position to the target position when no non-target transport vehicle is on the lift rail and no entry request signal is received from the non-target transport vehicle.

2. The article transport facility according to claim 1, wherein:

in response to the preliminary request signal from the target transport vehicle, the control system allows the lift rail at the target position to remain at the target position when receiving no entry request signal from the non-target transport vehicle.

3. The article transport facility according to claim 1, wherein:

when the non-target transport vehicle is on the lift rail, the control system prioritizes an operation of the lifter corresponding to a path for the non-target transport vehicle on the lift rail over the preliminary lifting process, and when no non-target transport vehicle is on the lift rail, the control system prioritizes an operation of the lifter corresponding to the path for the non-target transport vehicle over the preliminary lifting process in response to the entry request signal from the non-target transport vehicle received after the preliminary request signal from the target transport vehicle and before the entry request signal from the target transport vehicle.

4. The article transport facility according to claim 1, wherein:

the target transport vehicle enters the lift rail in response to the entry permission signal, and after entering the lift rail, transmits an exit request signal to the control system to request permission for entering a target downstream area, where the target downstream area is one of the first downstream area or the second downstream area to which the target transport vehicle travels, upon receiving the exit request signal from the target transport vehicle, the control system transmits an exit permission signal to the target transport vehicle to permit entry into the target downstream area when the lift rail is at one of the first position or the second position corresponding to the target downstream area, and the target transport vehicle exits the lift rail and enters the target downstream area in response to the exit permission signal.

5. The article transport facility according to claim 4, wherein:

after exiting the lift rail, the target transport vehicle transmits, to the control system, a main line entry notification signal indicating that the target transport vehicle has entered the target downstream area.

6. The article transport facility according to claim 5, wherein:

the control system identifies an estimated position of each of the plurality of transport vehicles along a transport path of the transport vehicle, and determines whether the target transport vehicle has entered the target downstream area based on the estimated position of the target transport vehicle when the control system receives no main line entry notification signal from the target transport vehicle within a predetermined period after transmitting the exit permission signal to the target transport vehicle.

7. The article transport facility according to claim 1, wherein:

the control system comprises a lift controller to control the lifter and a host controller to control the plurality of transport vehicles and the lift controller, and the plurality of transport vehicles transmit or receive signals to or from the host controller through wireless communication using radio waves.

\* \* \* \* \*